(12) United States Patent
Bittencourt

(10) Patent No.: US 11,826,745 B2
(45) Date of Patent: Nov. 28, 2023

(54) METHOD OF MAINTAINING THE ACTIVITY OF PRE-REFORM CATALYSTS

(71) Applicant: Petróleo Brasileiro S.A.—Petrobras, Rio de Janeiro (BR)

(72) Inventor: Roberto Carlos Pontes Bittencourt, Rio de Janeiro (BR)

(73) Assignee: Petróleo Brasileiro S.A.—Petrobras, Rio de Janeiro (BR)

(*) Notice: Subject to any disclaimer, the term of this patent is extended or adjusted under 35 U.S.C. 154(b) by 0 days.

(21) Appl. No.: 17/725,286

(22) Filed: Apr. 20, 2022

(65) Prior Publication Data
US 2022/0339617 A1  Oct. 27, 2022

(30) Foreign Application Priority Data
Apr. 22, 2021 (BR) .................. 10 2021 007738 7

(51) Int. Cl.
*B01J 38/62* (2006.01)
*B01J 23/755* (2006.01)
*B01J 38/52* (2006.01)

(52) U.S. Cl.
CPC ............. *B01J 38/62* (2013.01); *B01J 23/755* (2013.01); *B01J 38/52* (2013.01)

(58) Field of Classification Search
CPC ........ B01J 23/755; B01J 23/94; B01J 35/023; B01J 37/0036; B01J 38/06; B01J 38/62; C01B 3/38; C01B 2203/0261; C01B 2203/1058; C01B 2203/1264
See application file for complete search history.

(56) References Cited

U.S. PATENT DOCUMENTS

| | | | |
|---|---|---|---|
| 3,552,024 A | 1/1971 | Hunter | |
| 5,264,202 A | 11/1993 | Snyder | |
| 6,335,474 B1 | 1/2002 | Ostberg et al. | |
| 6,818,028 B2 | 11/2004 | Barnett et al. | |
| 7,365,102 B1 | 4/2008 | Weissman | |
| 10,029,224 B2* | 7/2018 | Knudsen ............. | B01J 19/2445 |
| 10,259,708 B2 | 4/2019 | Gronemann et al. | |
| 2018/0170751 A1* | 6/2018 | Warta ..................... | C01B 3/38 |

FOREIGN PATENT DOCUMENTS

| EP | 1616838 A2 | 1/2006 |
|---|---|---|
| EP | 3354993 A1 | 8/2018 |

OTHER PUBLICATIONS

Arena et al. (2004) "Modelling the activity-stability pattern of Ni/MgO catalysts in the pre-reforming of n-hexane", Applied Catalysis A: General, 266:155-162.
Oechsler et al. (Nov. 9, 2020) "Analysis and Simulation of Catalytic Steam Prereforming of Hydrocarbons in Adiabatic Tubular Reactors", Industrial & Engineering Chemistry Research—ACS Publications, 59(46):20285-20297.
Shakoor et al. (2000) "Pre-reforming Technology and Catalysts in Ammonia Plant", Ammonia Technical Manual, 279-284.
Sperle et al. (Mar. 30, 2005) "Pre-reforming of Natural Gas on a Ni Catalyst: Criteria for Carbon Free Operation", Applied Catalysis A: General, 282(1-2):195-204.

* cited by examiner

*Primary Examiner* — Brian A McCaig
(74) *Attorney, Agent, or Firm* — Mintz Levin Cohn Ferris Glovsky and Popeo, P.C.

(57) ABSTRACT

The present invention addresses to a method of maintaining the activity of pre-reform catalysts in hydrogen production units, in order to avoid deactivation by oxidation or coke deposition of pre-reform catalysts in the absence of hydrogen in the feed consisting of hydrocarbon and water vapor.

5 Claims, 2 Drawing Sheets

METHOD OF MAINTAINING THE ACTIVITY OF PRE-REFORM CATALYSTS

FIELD OF INVENTION

The present invention addresses to a method of maintaining the activity of pre-reform catalysts, having nickel as the active phase and with application in hydrogen production units, in order to avoid the deactivation of pre-reform catalysts by oxidation or by deposition of coke in the absence of hydrogen in the load, consisting of water vapor and hydrocarbons.

DESCRIPTION OF THE STATE OF THE ART

Hydrogen and hydrogen-rich gases, called synthesis gas, are produced on a large scale for use in the refining industry, in the production of ammonia, methanol, liquid hydrocarbons from the "Fischer Tropsch" process and in various petrochemical and hydrogenation processes of solvents, paraffins and products used in the food industry. More recently, hydrogen has been increasingly used to replace fossil fuels in applications such as residential heating, as a vehicle fuel associated with fuel cells or even studied for use as jet fuel.

Hydrogen and hydrogen-rich gases are industrially produced on a large scale mainly by the process called steam reforming. The process can utilize hydrocarbons chosen from natural gas, liquefied petroleum gas (LPG), refinery gases and naphtha, although the broader use in industry is in the production of hydrogen from natural gas. The main reactions that occur in the steam reforming process are the so-called reforming reactions (reaction 1 and 2) and the shift reaction (reaction 3), represented below:

$$C_nH_m + nH_2O = nCO + (\tfrac{1}{2}m+n)H_2 \text{ (endothermic reaction)} \quad \text{Reaction 1}$$

$$CH_4 + H_2O = CO + 3H_2 \text{ (endothermic, 206.4 KJ/mol)} \quad \text{Reaction 2}$$

$$CO + H_2O = CO_2 + H_2 \text{ (exothermic, −41.2 KJ/mol)} \quad \text{Reaction 3}$$

The steam reforming process can have different configurations, which are influenced by the type of load and the intended use of the hydrogen-rich gas produced. Such configurations may include a pre-reform reactor, this option being particularly advantageous when the unit uses naphtha, either as a single load or in different mixing ratios with natural gas, as it allows flexibility in the type of load and provides greater protection to avoid the occurrence of deactivation by deposition of coke or poisoning by contaminants, such as sulfur, of the catalysts of the downstream step, called primary reform, acting as a guard bed.

The use of a pre-reform section in the steam reforming process is also particularly useful when there is no demand for the steam that is generated in the process, since the inclusion of a pre-reform section allows operating with smaller excess of steam in relation to the stoichiometry of the reactions (reactions 1, 2 and 3) and, consequently, in this condition, the export of steam is also reduced. The pre-reform step can also be included in existing steam reforming units, aiming at increasing capacity, as taught in the literature by SHAKOOR, A.; HENRIKSEN, F. A.; FEDERSEN, M. (2002), "Pre-reforming technology and catalysts in Ammonia Plant", Ammonia Technical Manual, p. 279-284.

The pre-reform section is also an integral part of $H_2$ production processes that use the autothermal reforming path. Typically, in this path, the effluent gases from the pre-reform step are transformed into a low methane syngas in a downstream section, in the presence of a fixed bed catalyst and in the presence of oxygen, oxygen-rich gases or air, such as in the so-called Syncor™ process. The autothermal reforming paths can also add oxygen in the pre-reforming step itself over a catalyst that is active under oxidation conditions, typically consisting of or containing noble metals in its formulation. Thus, the U.S. Pat. No. 6,335,474 teaches the use of pre-reforming in the presence of oxygen using catalysts based on noble metal. Such processes have a high cost due to the use of oxygen and catalysts containing noble metals and, therefore, have low industrial application in large units, wherein the steam reforming process using nickel catalysts is the most used.

The pre-reform step can also be used to produce synthetic natural gas. Reference U.S. Pat. No. 3,552,024 teaches, for example, the production of a gas containing more than 70% methane by contacting a paraffinic hydrocarbon with 2 to 15 carbon atoms under pre-reforming conditions, with a steam to carbon ratio in the range of 1.2:1 to 6:1 with a nickel-based and barium-promoted catalyst. U.S. Pat. No. 7,365,102 teaches the production of a methane-rich gas by contacting a hydrocarbon stream, including naphtha, gasoline, kerosene and diesel, with water vapor at a $H_2O/C$ ratio of less than 1 mol/mol in the presence of a catalyst, wherein said catalyst comprises Ni or Rh. The pre-reform step is thus widely used in the industry for the production of hydrogen, and the maintenance of the performance of the catalyst used in this step is essential to reduce the costs and risks of the process.

In the steam reforming process for hydrogen production, the pre-reforming step can be included between the pre-treatment and primary reforming sections. The pre-treatment section contains one or more hydrotreatment reactors, whose main function is the catalytic transformation of sulfur or chloride present in hydrocarbon molecules, into $H_2S$ and HCl, respectively. Another function is the removal of olefins, if present in the load, down to ppm levels. The hydrotreating reaction occurs by the reaction of hydrogen with the hydrocarbon molecules, in the presence of a catalyst. The hydrogen required for the reactions is a fraction of the hydrogen produced in the unit that is returned to the pre-treatment section of the unit, by using compressors.

The hydrocarbon feed from the pre-treatment section, purified from contaminants such as olefins, sulfur or chlorides, and containing $H_2$, is mixed with steam generated in the process and then transformed on a fixed bed of catalyst in the pre-reform section into a gas rich in $CH_4$ and $H_2$ and containing contents of $CO_2$ and minor contents of CO, with a composition close to that predicted by the thermodynamic equilibrium of the set of reactions 1 to 3.

The literature also teaches the use of other types of reactors, such as convective ones, particularly useful for low-capacity units or in increasing the capacity of existing units. The U.S. Pat. No. 6,818,028 teaches, for example, the use of a pre-reform reactor of the convective type where the catalyst is placed inside tubes transverse to the effluent gas of the root section of a primary reformer. Typical pre-reform section conditions in industrial hydrogen production units are the use of a nickel-based fixed bed catalyst, temperature between 330 and 500° C., steam/carbon ratios less than 3 mol/mol, typically less than 2 mol/mol, $H_2$/load ratios between 0.1 and 0.25 Nm³/kg of load and pressures between 10 and 40 bar (1 and 4 MPa). Under these conditions, the campaign time under industrial conditions is generally more than 3 years, preferably more than 4 years, depending on the type of load, levels of contaminants and the special velocity (GHSV) used in the reactor design. The pre-reforming catalyst used in large-capacity steam reforming units, such as those that produce more than 100,000 $Nm^3/d$, consists of nickel oxide, the remainder of the composition being variable depending on the supplier, and may be of magnesium, alumina, various promoters such as rare earths and others. Patent EP1616838 teaches, for example, a pre-reforming catalyst consisting of 1 to 20% w/w of nickel and 0.4 to 5% w/w of potassium, for the steam reforming of natural gas in steam/carbon ratios from 1.5:1 to 6:1 and temperatures from 300° C. to 700° C.

The nickel-based pre-reform catalyst can be supplied in the pre-reduced state, where the nickel oxide phase has been previously reduced to the active nickel metallic phase, followed by passivation, to facilitate transport and loading of the material, or in the oxidized state, a situation in which it is necessary to reduce the catalyst in the industrial unit, before starting the operation of the pre-reform section. The pre-reduced catalyst can be used in conditions where it is difficult to reduce the catalyst in the industrial unit, such as when there is no available hydrogen or there are no high temperature conditions to carry out the catalyst reduction step or even when the additional cost of pre-reducing the material is justified, with a reduction in the unit start-up time. The reduction of the nickel oxide phase of the pre-reform catalysts can be carried out with hydrogen. The literature teaches that, when hydrogen is not available, other fluids, such as methanol or ammonia, can be used. Document EP3354993 teaches the use of methanol, ammonia or urea introduced through a spray nozzle into a stream of water vapor to reduce the catalyst. U.S. Pat. No. 10,259,708 teaches a method for reducing a nickel-based pre-reforming catalyst by supplying, in a first step, methanol and water to the reactor, directing the gaseous stream produced to the autothermal reforming section and, in a third step, recirculating the gas containing hydrogen for the pre-reform step.

In the steam reforming process for the production of hydrogen, the gaseous effluent from the pre-reform section is sent to the primary reform section, consisting of a variable set of metallic tubes containing a fixed bed catalyst and inserted in a furnace that provides the energy required for the endothermic reforming reactions (reactions 1 and 2). The set of metallic tubes and furnace is called a reformer. The catalyst used industrially in large capacity units, such as those producing more than 100,000 $Nm^3/d$, is nickel-based and supported on refractory materials such as alumina or calcium or magnesium aluminates. The effluent gas from the primary reform section is rich in $H_2$ and contains methane in a lower concentration, in addition to significant contents of CO and $CO_2$. The composition of the gas is close to the value predicted by thermodynamic equilibrium. Typical operating conditions for the reformer are: inlet temperature between 600 and 650° C. and outlet temperature between 800 and 950° C., steam/carbon ratios between 2 and 4 mol/mol. When the objective is to produce high purity $H_2$, such as is needed in oil refining for use in the production of derivatives (gasoline or diesel) that meet the quality required by the market, the $H_2$-rich gas is sent to a shift section, where the water gas shift reaction (reaction 3) is conducted over a fixed bed of catalyst in order to reduce the CO content and increase the production of $H_2$. The most used shift catalyst when there is a pre-reform section in the unit is based on copper, zinc and alumina oxides, and is called "Medium Temperature Shift (MTS)". Next, the gas is purified in a section called PSA (Pressure Swing Adsorption), where by using fixed beds of alumina, active carbon and zeolites, a high purity $H_2$ is produced (>99.9% v/v) at high pressure and a gas rich in $CH_4$, CO, $CO_2$ and still containing appreciable contents of $H_2$ called purge gas, which returns to the reformer for use as fuel. A fraction of the hydrogen produced returns to the pre-treatment section, where it participates in the hydrotreatment reactions. This recycle hydrogen also has the important functions in the pre-reform section of preventing coke buildup and keeping the nickel-based pre-reforming catalyst in the reduced (active) state.

An important function of the recycle hydrogen in the pre-reform section is to prevent the oxidation of the metallic nickel phase, which is the active phase of the catalyst. The oxidation of the pre-reform catalyst can lead to its rapid deactivation, both by the direct loss of the active phase of metallic nickel and by the release of contaminants, such as sulfur, which are captured at the top of the bed. These contaminants, once released, will migrate to lower regions of the bed, thus increasing the loss of performance and leading to the anticipation of the shutdown of the unit and of the hydrogen consuming units, such as those for hydrotreatment for the production of fuels, such as gasoline or diesel, which can lead to a significant increase in costs and loss of revenue. The oxidation of the pre-reform catalyst still favors the escape of hydrocarbons larger than methane to the primary reform section, which can lead to the deactivation of this catalyst, with operational risks due to the appearance of high temperature regions in the tubes (reactors) of the reformer.

The oxidation of the pre-reform catalyst by the absence of $H_2$ in the feed can be considered as irreversible, for commercial nickel-based catalysts used industrially in large scale hydrogen production units, such as those that produce more than 10,000 $Nm^3/d$. The reference EP1586535 teaches in its examples that the addition of a hydrogen content in the reaction mixture of a nickel-based pre-reforming catalyst is mandatory for it to be active in the reforming or pre-reforming of natural gas. Industrial experience still teaches that, once oxidized by steam, the pre-reform catalysts cannot be easily reduced under the conditions of the pre-reform reactor, which forces the replacement of the inventory, causing high costs and impacts on safety, health and environment in the activities of unloading, loading and disposing of materials with high nickel contents. Although there is no scientific agreement, the best explanation for this fact stems from the formation of nickel hydroxide phases due to the action of steam and high temperature on metallic nickel. Such phases, once formed, could not be reduced to metallic nickel again under the usual temperature conditions of the pre-reforming process. Aware of this fact, manufacturers of pre-reform catalysts indicate, in their operating manuals, a typical maximum time limit of 10 minutes of absence of recycle hydrogen in the feed of the pre-reform reactor, before having to take emergency measures, in order to protect the integrity of the catalyst and consequently the maintenance of the operational continuity of the hydrogen production process.

In the case of failure of recycle hydrogen compressors, for a period longer than 10 minutes, the current steam reforming technologies, for the most part, guide the shutdown of the unit, depressurization and purge of the reactor. The reactor purge is typically carried out in a first step with hydrogen from a reservoir, which, for reasons of cost and risk reduction, has a volume of hydrogen stored only for the duration of the depressurization and purge steps of the reactor. In a second step, the purge is carried out with nitrogen to avoid condensation of steam in the reactor and/or the presence of $H_2$, CO or hydrocarbons. Another solution that can be adopted to protect the pre-reform catalyst inventory, in the event of a recycle hydrogen compressor failure, involves the use of interlock logic for the "by-pass" of the reactor with automatic activation valves. These solutions are expensive and, although they protect the pre-reform catalyst from further damage, they do not prevent the hydrogen production unit from shutting down.

Another important function of recycle hydrogen in the pre-reform section is to reduce coke buildup on the catalyst. The literature teaches that nickel-based pre-reform catalysts are subject to deactivation by coke formation. The formation of coke, exemplified by the formation of carbon on pre-reform catalysts, can occur by one or more of the reactions shown below (reactions 4 to 6). The literature teaches that the rate of coke formation can be controlled by the correct choice of the steam/carbon ratio and the $H_2$/load ratio, as described in SPERLE, T.; CHEN, D.; LODENG, R.; HOLMEN, A. (2005), "Pre-reforming of natural gas on a Ni catalyst: Criteria for carbon free operation", Applied Catalysis A: General, v. 282, p. 195-204.

$$C_nH_m = nC + m/2 H_2 \quad \text{Reaction 4}$$

$$CH_4 = C + 2H_2 \quad \text{Reaction 5}$$

$$2CO = C + CO_2 \quad \text{Reaction 6}$$

The risk of loss of pre-reform inventory, either by coking events, poisoning or by oxidation of the catalyst is so significant that some technologies consider the use of two pre-reform reactors in parallel, in order to ensure operational continuity. Another solution adopted in the industry is to maintain a volume of hydrogen stored at high pressure. However, such a solution entails costs due to equipment and, due to the characteristics of storage of volumes of gases, it only allows the maintenance of the recycle hydrogen for limited times, typically, to proceed with an emergency shutdown in a safe way, purging the reactor of pre-reforming in the presence of steam and hydrogen. Another solution is to maintain backup compressors for the recycle hydrogen, which also entails high costs and does not eliminate the occurrence of simultaneous equipment failures or lack of hydrogen, when the PSA system needs to go out of operation.

In large applications, defined here as units with a production greater than 10,000 $Nm^3/d$, pre-reform catalysts are composed of nickel oxide promoted by other materials such as alumina or magnesium oxide. A limitation of the current technique of nickel-based pre-reform catalysts is the deactivation due to the absence of hydrogen in the hydrocarbon and water vapor feed. This limitation stems from the known fact that, under typical conditions of the pre-reforming step, that is, temperatures between 330 and 500° C. and pressures between 10 and 30 $kgf/cm^2$ (0,981 and 2,942 MPa), the absence of hydrogen in the feed leads to a permanent loss of catalyst activity. This limitation of the state of the art of nickel-based pre-reform catalysts causes the unit to be shut down immediately, when there is a failure in the flow rate of hydrogen in the feed, in order to protect the pre-reform catalyst, with loss of production and equipment integrity risks due to typical rapid unit depressurization procedures. Alternative solutions involve the use of pressurized hydrogen vessels, duplication of equipment, such as compressors, which raise the costs of hydrogen production, or noble metal-based catalysts, which, in addition to the high cost, have other restrictions due to deactivation by contaminants, such as sulfur, which may be present in the load.

The document of ARENA, F. et al. (2004), "Modelling the activity-stability pattern of Ni/MgO catalysts in the pre-reforming of n-hexane", Applied Catalysis A: General, v. 266, p. 155-162, describes a series of results concerning the performance of a 19% Ni/MgO catalyst in the pre-reforming of n-hexane at 450° C. and 10 bar (1 MPa) in the steam/carbon ratio (S/C) varying between 1.5 and 3.5 in the presence and absence of hydrogen. However, this document only discloses the problem of the absence of $H_2$ and the deactivation rate of the Ni/MgO catalyst, and does not try to solve this problem by adding selected molecules in the reactor feed and in a correct ratio of steam/molecule.

The reference of OECHSLER, B. F. et al. (2020), "Analysis and simulation of catalytic steam pre-reforming of hydrocarbons in adiabatic tubular reactors", Industrial & Engineering Chemistry Research, v. 59, p. 20285-20297, refers to a simulation of the pre-reform step of natural gas or naphtha. The results of these authors show that, for the same inlet temperature of the pre-reform reactor, without the use of recycle $H_2$, the temperature along the reactor is lower than when there is recycle $H_2$. This fact is known by the industry and illustrates another risk associated with the sudden absence of recycle $H_2$, which is to reduce the temperature of the catalytic bed, reaching conditions where hydration and formation of magnesium hydroxide occur from magnesium oxide phases, a constituent typical of commercial pre-reform catalysts. The hydration of the catalyst causes the loss of mechanical strength leading to an increase in the pressure drop in the reactor which, in more serious situations, leads to the unscheduled shutdown of the unit or, more typically, to the reduction of the expected campaign time. However, such a reference does not disclose the use of a catalyst activity maintenance fluid selected from methanol, formaldehyde, formic acid or a mixture thereof.

Document U.S. Pat. No. 5,264,202A discloses a process of pre-reforming and primary reforming of a hydrocarbon feed stream containing methane to produce a reformate of hydrogen and carbon monoxide. Furthermore, the use of a pre-reform catalyst, containing a nickel content, is disclosed, as well as the use of convective heating temperatures not exceeding 1200° F. (≅649° C.). However, this document also does not mention a fluid for maintaining the activity of pre-reform catalysts selected from methanol, formaldehyde, formic acid or a mixture thereof.

Accordingly, although there are several teachings in the literature on the formulation, reactor configuration, use or methods of activation of the nickel-based pre-reform catalyst, there is no teaching of a method that can maintain the properties of this catalyst in the absence of hydrogen in the load.

It is clearly desirable by the industry a method that preserves the properties of the pre-reform catalyst, in the event of a failure in the recycle hydrogen feed, avoiding the deactivation of the catalyst by oxidation or coke deposition or the unscheduled shutdown of the unit, ensuring the maintenance of the operational continuity of the hydrogen production unit; such is the objective of the present invention.

In view of this, no document of the state of the art discloses a method of maintaining the activity of pre-reform catalysts such as the present invention.

In order to solve such problems, the present invention was developed, by means of the use of a method of maintaining the properties of the nickel-based pre-reform catalyst, in the absence of hydrogen in the hydrocarbon and water vapor feed. The method avoids shutting down the hydrogen production unit, which would entail significant operational costs and risks.

The present invention further addresses to the use of the method thus developed in the large-scale hydrogen production process by the hydrocarbon steam reforming process.

The present invention has several advantages, such as:

Reduction of scheduled shutdowns in hydrogen generation/hydrotreatment units of diesel, when there is a failure of the hydrogen feed in the pre-reform section load;

Reduction of the risk associated with emergency shutdowns at hydrogen generation units;

Minimization of the risks of deactivation of the pre-reform catalyst inventory that contains in its composition typical contents of nickel oxide above 40% m/m, thus avoiding the need for disposal of used material and loading of new material, minimizing risks of handling material with carcinogenic potential;

It allows to keep the unit in operation due to the injection of methanol, formic acid, formaldehyde or a mixture thereof, significantly increasing the reliability of the diesel hydrotreatment set, in the event of recycle hydrogen failure.

BRIEF DESCRIPTION OF THE INVENTION

The present invention addresses to a method to prevent deactivation by oxidation or by deposition of coke of the pre-reform catalyst in the absence of hydrogen in the feed consisting of hydrocarbon and water vapor.

In a second aspect, the present invention relates to a method to avoid the unscheduled shutdown of a hydrogen production unit by steam reforming, avoiding the loss of performance of the pre-reform catalyst.

BRIEF DESCRIPTION OF DRAWINGS

The present invention will be described in more detail below, with reference to the attached figures, which, in a schematic way and not limiting the inventive scope, represent examples of embodiment thereof. In the drawings, there are.

DETAILED DESCRIPTION OF THE INVENTION

Figure 1:
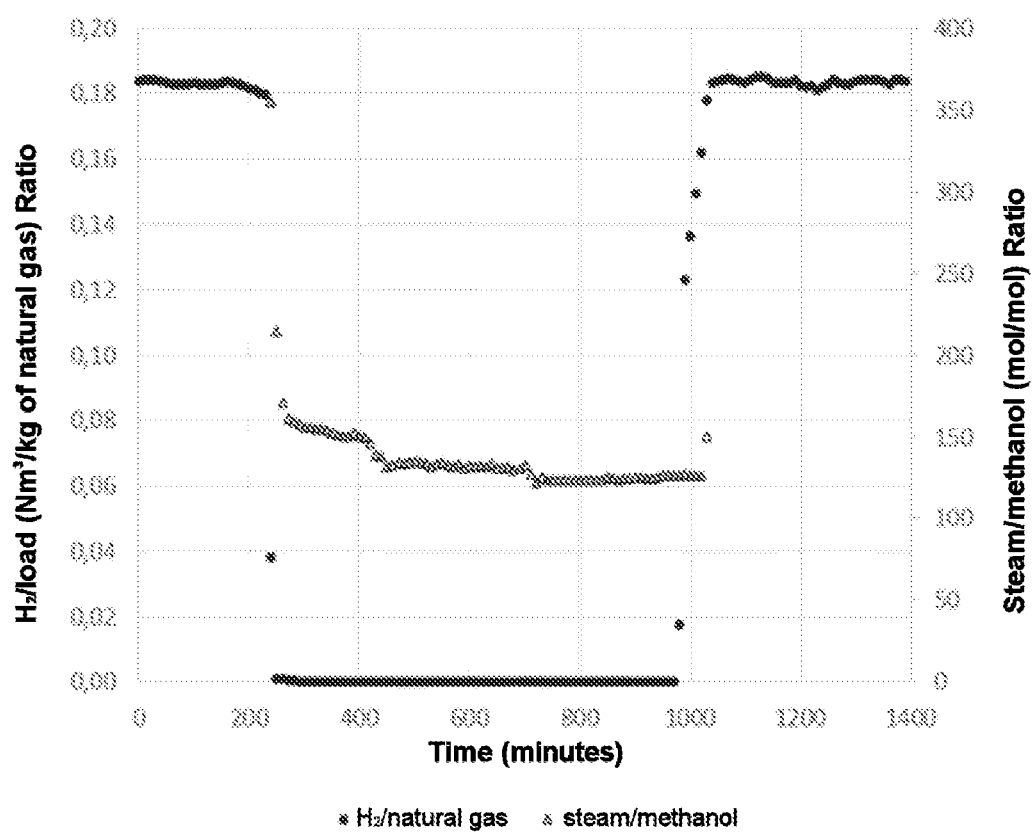
FIG. 1 illustrating a graph of $H_2$/natural gas and steam/methanol ratios in the pre-reform reactor during an event of absence of hydrogen in the feed of this reactor in an industrial unit with a production capacity of 3,000,000 $Nm^3$/d of hydrogen.

The method of maintaining the activity of pre-reform catalysts containing nickel as an active phase, including the continuity in operation of hydrogen or synthesis gas production units, when there is no hydrogen in the feed of the pre-reform reactor, according to the present invention, comprises the following steps:

a) introducing into the feed of the pre-reform reactor a catalyst activity maintenance fluid, in which the fluid is selected from methanol, formaldehyde, formic acid or mixtures thereof, in which the steam/fluid ratio is between 200 and 40 mol/mol, preferably between 150 and 80 mol/mol and reactor inlet temperature between 430 and 550° C., preferably between 450 and 500° C.;

b) stopping the feed of the catalyst activity maintenance fluid in the pre-reform reactor, when the hydrogen returns in the reactor feed and it has reached a $H_2$/hydrocarbon ratio between 0.1 and 0.2 $Nm^3$/kg, where the hydrocarbon is selected from natural gas, liquefied petroleum gas, refinery gas or naphtha.

EXAMPLES

The following examples are presented in order to more fully illustrate the nature of the present invention and the manner of practicing the same, without, however, being considered as limiting its content.

Example 1

A nickel-based pre-reform catalyst was previously ground and sieved in the range of 25 to 35 mesh. Two grams of the catalyst were loaded into a stainless-steel reactor. The catalyst was activated (reduced) in $N_2$ flow from room temperature to 350° C. at the pressure of 20 atm (2,027 MPa), which was maintained for 1 hour and then in flow of 10% $H_2$ in nitrogen until 450° C. After 2 hours at 450° C., the hydrogen was removed and steam or steam/methanol fed for a period of 24 hours. After this period, the steam reforming activity of methane was measured at temperatures of 450° C., 500° C. and 550° C. with a steam/carbon ratio of 2.0 mol/mol and with 5% of hydrogen in the load.

The results are presented in Table 1 and allow to note that: a) The passage of steam in the absence of hydrogen over the pre-reform catalyst, under typical conditions of industrial operation, makes the material inactive; b) The addition of methanol in steam, at values as low as a steam/methanol molar ratio of 592 mol/mol, allows maintaining a significant fraction of the catalyst activity.

The use of a low flow rate of methanol is of industrial interest to reduce its consumption, especially due to the absence of hydrogen in the hydrocarbon and steam load at the pre-reformer inlet, typically due to the need for maintenance in the compressors of hydrogen recycling, an activity that tends to last a period of several hours or even days. On the other hand, it is not in the industrial interest to maintain a significant volume of methanol stored, due to infrastructure costs or safety, environmental and health issues.

TABLE 1

Conversion of methane in a commercial nickel-based pre-reform catalyst after different catalyst treatments.

| Treatment | 450° C. | 500° C. | 550° C. |
|---|---|---|---|
| Steam/methanol in the ratio of 592 mol/mol | 12 | 20 | 27 |
| Steam/methanol in the ratio of 103 mol/mol | 13 | 24 | 33 |
| Steam only | <1 | <1 | <1 |

Example 2

A nickel-based pre-reform catalyst was previously ground and sieved in the range of 100 to 150 mesh and loaded into a fixed bed in a quartz reactor. Methanol and water vapor were fed by passing nitrogen through saturators maintained at 15° C. The conversion of methanol was studied at atmospheric pressure, a steam/carbon ratio of 2.2 mol/mol and GHSV of 39,000 h$^{-1}$. The experiments were repeated, in the same experimental condition but in the absence of catalyst, to determine the conversion from thermal decomposition.

The results are presented in Table 2. The results show that pre-reform catalyst bed temperatures between 450° C. and 500° C. are preferable to have a high rate of catalytic decomposition of methanol and, at the same time, limit the potential oxidation of the catalyst by steam, allowing the use of lower steam/methanol ratios.

TABLE 2

Conversion of methanol in the pre-reforming reaction in the presence or absence of a nickel-based catalyst.

| Temperature (° C.) | Thermal Decomposition (%) | Catalytic Decomposition (%) |
|---|---|---|
| 450 | ~0 | 98.6 |
| 500 | <5 | >98.9 |
| 650 | <5 | ~100 |
| 700 | <5 | ~100 |

Example 3

This example illustrates the use of methanol or other classes of molecules to maintain pre-reform catalyst activity in the absence of recycle hydrogen. One of the most important requirements for a molecule to be used in the maintenance of pre-reform catalyst activity is to have a high rate of H$_2$ generation and, at the same time, to present a low risk of olefin formation or other compounds with high potential of coke deposition. This criterion eliminates the use of other alcohols such as ethanol or glycerin, as these molecules, under pre-reform conditions and in the presence of nickel-based catalysts, tend to generate olefins or other compounds that can rapidly increase the deposition rate of coke on the catalyst and, consequently, increase the loss of load in the reactor and reduce the campaign time.

Table 3 summarizes properties and characteristics of different classes of molecules that could be used in the present invention to replace methanol.

TABLE 3

Class of compounds and their use to maintain the performance of nickel-based pre-reform catalysts.

| Compound | Note |
|---|---|
| Alcohols | Methanol (CH$_3$OH) can be used, according to the present invention, as it presents a high decomposition rate for H$_2$ and a low risk of coke formation. Higher molecular weight alcohols, such as ethanol (C$_2$H$_5$OH) or glycerin (C$_3$H$_8$O$_3$), should not be used due, to the high rate of formation of olefins or other compounds having a high potential for deposition of coke on the pre-reform catalyst. |
| NH$_3$ or amines that can generate NH$_3$. | NH$_3$ generates a temporary loss of pre-reform catalyst activity, which can lead to larger hydrocarbons escaping into the reformer. In addition, if NH$_3$ escapes and it reaches the "Medium Temperature Shift (MTS)" catalyst, it will cause permanent deactivation. NH$_3$ or amines that decompose to NH$_3$ can be used when it is decomposed before being fed to the pre-reform reactor, but this entails the need for additional equipment and consequently additional costs to the process. |
| Organic acids | Formic acid (CH$_2$OH) can be used because it has a high decomposition rate for H$_2$ and a low risk of coke formation. Higher molecular weight acids, such as acetic acid (CH$_3$COOH), should not be used due to the tendency to form compounds having a high potential for coke deposition on the pre-reform catalyst. |
| Ketones | Ketones, such as acetone (CH$_3$—CO—CH$_3$), should not be used due to the tendency to form compounds having a high potential for coke deposition on the pre-reform catalyst. |
| Aldehydes | Formaldehyde (COH$_2$) can be used. Higher molecular weight aldehydes should not be used due to the high rate of formation of olefins or other compounds having a high potential for deposition of coke on the pre-reform catalyst. |

Example 4

This example illustrates the effects on the outlet temperature and the effluent composition of the pre-reform reactor, in the presence of hydrogen or in the absence of hydrogen with methanol injection, for a typical operating condition of an industrial unit. The simulations were performed using the PRO-II (AVEVA) program, modeling the pre-reform reactor as an adiabatic "Gibbs" reactor.

The results are presented in Table 4 and show that: a) The lack of recycle H$_2$, in addition to causing the deactivation of the catalyst, due to the oxidation mechanisms of the metallic nickel active phase and the increase in the coke deposition rate, causes the temperature to drop along the pre-reform reactor (comparison between conditions 1 and 2). The drop in temperature, in turn, brings the additional risks of leakage of hydrocarbons with molecular weight above methane, which can lead to coking of the primary reform catalyst that follows the pre-reform one.

TABLE 4

Effect on the composition and outlet temperature of the pre-reform reactor effluent when there is no recycle H$_2$ or methanol feed.

| Condition | 1 | 2 | 3 | 4 | 5 | 6 |
|---|---|---|---|---|---|---|
| Inlet temperature (° C.) | 490 | 490 | 490 | 490 | 490 | 490 |
| H$_2$/natural gas (Nm$^3$/kg) | 0.09 | 0 | 0 | 0 | 0 | 0 |

TABLE 4-continued

Effect on the composition and outlet temperature of the pre-reform reactor effluent when there is no recycle $H_2$ or methanol feed.

| Condition | 1 | 2 | 3 | 4 | 5 | 6 |
|---|---|---|---|---|---|---|
| Steam/carbon (mol/mol) | 2.3 | 2.3 | 2.3 | 2.3 | 2.3 | 2.3 |
| Steam/methanol (mol/mol) | — | — | 103 | 80 | 40 | 23.4 |
| Outlet temperature (° C.) | 444.2 | 433.7 | 440.7 | 442.7 | 451.3 | 462.44 |
| Effluent composition (% molar) | | | | | | |
| $H_2$ | 20.16 | 17.73 | 18.43 | 18.65 | 19.53 | 20.51 |
| $N_2$ | 0.54 | 0.55 | 0.54 | 0.54 | 0.53 | 0.51 |
| CO | 0.00 | 0.00 | 0.00 | 0.00 | 0.26 | 0.26 |
| $CO_2$ | 6.81 | 7.48 | 8.13 | 8.11 | 8.71 | 9.49 |
| Methane | 72.48 | 74.24 | 72.90 | 72.70 | 71.24 | 69.23 |

Note:
Reactor inlet pressure 27 bar (2.7 MPa); pressure drop of 1.4 kgf/cm$^2$ · m (137.29 kPa · m) composition (mol %) of: $N_2$ = 0.69; $CO_2$ = 1.33; methane = 89.91; ethane = 5.53; propane = 1.67; n-butane = 0.65 and n-pentane = 0.30.

Another risk stems from the fact that some commercial pre-reform catalysts contain magnesium oxide in their formulation, a phase that can hydrate to magnesium hydroxide with a reduction in temperature, leading to events of increase of load loss in the reactor; b) In the absence of recycle hydrogen, the methanol flow rate can be selected in order to avoid sudden changes in the reactor outlet temperature. A very high flow rate of methanol is not desirable, due to issues of cost, safety and storage logistics, but also because it causes more accentuated changes in the composition and temperature of the pre-reform reactor, which causes disturbances in the process (comparison between conditions 1 to 6).

Alternatively, a higher flow rate of methanol can be used immediately after the drop in the flow rate of recycle $H_2$ so that there is no discontinuity of the presence of a reducing agent in the feed of the pre-reform reactor and, next, a reduction in methanol flow rate in order to alter the temperatures as little as possible throughout the reactor.

Example 5

This example, according to the present invention, uses the injection of methanol when the recycle hydrogen fails in an industrial hydrogen production unit by steam reforming. The unit has a nominal capacity of 3,000,000 Nm$^3$/d and is configured with a pre-treatment section containing CoMo/alumina-type catalysts and zinc oxide-type absorbents. The purified natural gas load is mixed with process steam and recycle hydrogen and fed to the pre-reform reactor. The effluent from the pre-reform reactor feeds the primary reform section and then the "Medium Temperature Shift (MTS)" section. The recycle hydrogen is provided by compressors and, due to maintenance issues, these devices shut down and the consequent failure in the hydrogen supply occurred.

FIG. 1 illustrates the $H_2$/natural gas ratio and the injection of methanol into the reactor, in a steam/methanol ratio between 150 to 100 mol/mol, during the failure of the recycle $H_2$ feed, according to the present invention. The injection of methanol made it possible to maintain the unit in operation, producing hydrogen during the entire period, estimated at around 12 hours, of compressor maintenance.

Figure 2:
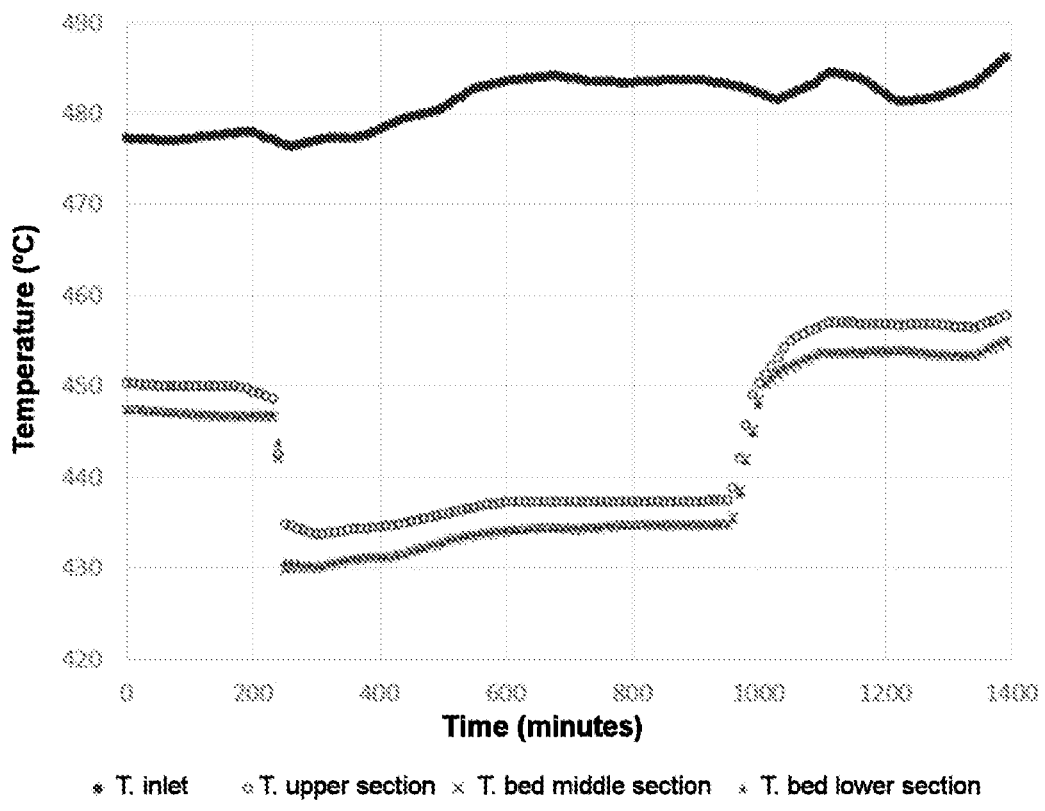
FIG. 2 illustrating a graph of temperatures at the inlet and the upper, middle and lower regions of the pre-reform reactor bed of an industrial unit with a production capacity of 3,000,000 $Nm^3$/day of hydrogen during an event in which there was no hydrogen in the reactor feed and, according to the present invention, it was then fed methanol in a steam/methanol ratio between 150 to 100 mol/mol.

FIG. 2 shows the impact on reactor temperatures. After the return of hydrogen in the reactor feed, the temperatures and the effluent composition of the reactor returned to the previous values, indicating that there was no significant deactivation of the inventory.

It should be noted that, although the present invention has been described in relation to the attached drawings, it may undergo modifications and adaptations by technicians skilled on the subject, depending on the specific situation, but provided that it is within the inventive scope as defined herein.

The invention claimed is:

1. A method of maintaining the activity of pre-reform catalysts, containing nickel as the active phase, in the absence of recycle hydrogen in a feed of a pre-reform reactor, characterized in that the following steps are carried out:
   a) introducing in the feed of the pre-reform reactor a catalyst activity maintenance fluid, in which a steam/fluid ratio is between 200 and 40 mol/mol and a reactor inlet temperature is between 430 and 550° C.; and
   b) stopping the feed of the catalyst activity maintenance fluid in the pre-reform reactor, when the hydrogen returns in the reactor feed and it has reached a $H_2$/hydrocarbon ratio between 0.1 and 0.2 Nm$^3$/kg.

2. The method according to claim 1, characterized in that the catalyst activity maintenance fluid is selected from methanol, formaldehyde, formic acid, or mixtures thereof.

3. The method according to claim 1, characterized in that the steam/fluid ratio is between 150 and 80 mol/mol.

4. The method according to claim 1, characterized in that the reactor inlet temperature is between 450° C. and 500° C.

5. The method according to claim 1, characterized in that the hydrocarbon (load) is selected from natural gas, liquefied petroleum gas, refinery gas or naphtha.

* * * * *